United States Patent [19]
Yamada

[11] Patent Number: 5,786,926
[45] Date of Patent: Jul. 28, 1998

[54] ELECTRO-OPTICAL DEVICE HAVING INVERTED DOMAINS FORMED INSIDE A FERRO-ELECTRIC SUBSTRATE AND ELECTRO-OPTICAL UNIT UTILIZING THEREOF

[75] Inventor: Masahiro Yamada, Kanagawa, Japan

[73] Assignee: Sony Corporation, Tokyo, Japan

[21] Appl. No.: 754,136

[22] Filed: Nov. 22, 1996

[30] Foreign Application Priority Data

Nov. 24, 1995 [JP] Japan ................................ 7-329851

[51] Int. Cl.⁶ ................................................ G02F 1/03
[52] U.S. Cl. ........................ 359/250; 359/251; 359/315
[58] Field of Search ........................ 359/255, 282, 359/250, 251, 283, 298, 315, 314, 310, 293

[56] References Cited

U.S. PATENT DOCUMENTS

| | | | |
|---|---|---|---|
| 3,667,830 | 6/1972 | Rottmiller | 359/293 |
| 3,799,648 | 3/1974 | Flippen | 359/251 |
| 3,953,109 | 4/1976 | Kumada | 359/225 |
| 4,330,178 | 5/1982 | McNaney | 359/310 |
| 5,122,894 | 6/1992 | Grantham | 359/315 |
| 5,193,023 | 3/1993 | Yamada et al. | 359/251 |
| 5,247,528 | 9/1993 | Shinozaki et al. | 372/22 |
| 5,317,446 | 5/1994 | Mir et al. | 359/296 |
| 5,519,802 | 5/1996 | Field et al. | 385/129 |
| 5,594,746 | 1/1997 | Harada | 372/22 |

*Primary Examiner*—David C. Nelms
*Assistant Examiner*—Thomas Robbins
*Attorney, Agent, or Firm*—Hill, Steadman & Simpson

[57] ABSTRACT

An electro-optical device such as an optical deflector comprising a ferro-electric substrate, electrodes provided on principal surfaces of this substrate and an inverted domain having a polygonal, e.g. triangular shape formed in the substrate, at least one of the domain walls of these domains being effectively perpendicular to the principal surfaces of the substrate, and a light beam passing through at least two of the domain walls, thus permitting fast random access, wide deflection angle and high resolution.

14 Claims, 17 Drawing Sheets

⇧ : SPONTANEOUSLY-FORMED POLE DIRECTION

⇧ : SPONTANEOUSLY-FORMED POLE DIRECTION

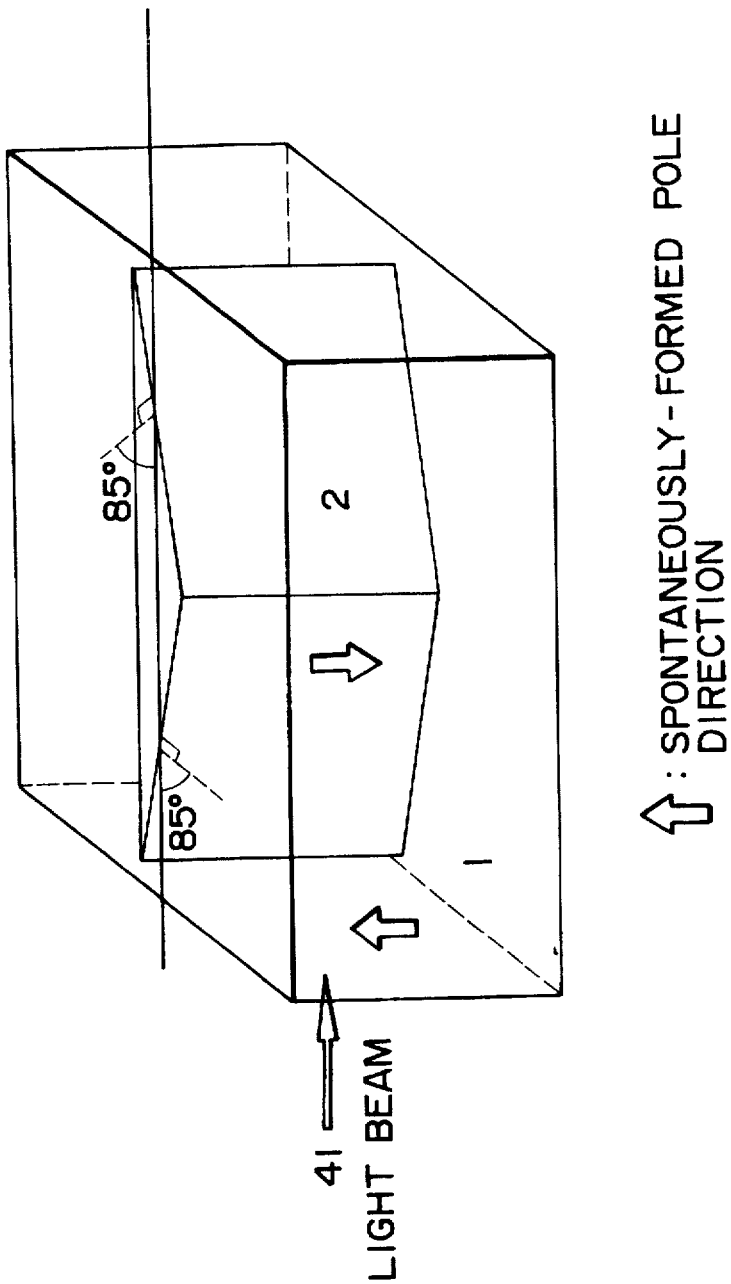

⇧ : SPONTANEOUSLY-FORMED POLE DIRECTION

ELECTRO-OPTICAL DEVICE HAVING INVERTED DOMAINS FORMED INSIDE A FERRO-ELECTRIC SUBSTRATE AND ELECTRO-OPTICAL UNIT UTILIZING THEREOF

BACKGROUND OF THE INVENTION

1. Field of the Invention

The present invention relates to electro-optical devices and more particularly to devices which use electro-optical effects such as optical deflectors.

2. Description of Related Art

Devices known in the art which use electro-optical effects include optical deflectors and optical modulators. Devices which do not use such effects include lenses and mirrors.

Optical deflectors commonly used to electronically deflect a light beam include a galvanometer type, rotating multi-surface reflecting mirror type, and a rotating hologram type. Since all these deflectors are electromechanical deflecting means, they are unsuited for short-term random access although they do permit high resolution and considerably high speed continuous scanning.

Other high speed deflectors use Bragg diffraction by an acousto-optical diffraction grating. These have access times of the order of microseconds, however they can produce only a small deflection angle, they are limited in the number of spots than can be scanned and the output beam is also split into several beams.

Deflectors using electro-optical effects operate at even higher speeds (e.g. of the order of nanoseconds), but their resolving power is still lower.

Lenses of variable focal length are manufactured by combining a plurality of lenses which can be mechanically displaced so as to vary the distances between them, however this requires a complex construction and manipulation, and response speed is also inadequate.

Until now, mirrors too have been fixed structures, and mirrors which are made to appear and disappear by a signal were unknown. Mirrors therefore had limited practicality.

As described hereintofore, conventional light deflectors such as electromechanical deflectors, deflectors using acousto-optical effects and deflectors using electro-optical effects all had their respective advantages and disadvantages. In the prior art, optical deflectors which have both high speed and high resolving power did not exist.

Further, there were no single lenses of variable focal length, or mirrors which could be switched on and off.

SUMMARY OF THE INVENTION

It is therefore an object of this invention to provide an electro-optical device such as a high resolution optical deflector which allows fast random access, gives a large deflection angle, and has high resolving power.

This invention therefore relates to an electro-optical device comprising a ferro-electric substrate, electrodes provided on principal surfaces of the substrate and inverted domains formed with a predetermined shape inside the substrate, at least one of the walls of these domains being substantially perpendicular to the principal surfaces of the substrate, and a light beam traversing at least two of the domain walls.

According to the electro-optical device of this invention, a refractive index difference is produced between the substrate and inverted domains by applying a voltage via electrodes formed on the principal surfaces of the substrate which comprises a plurality of inverted domains. As a result, a light beam is largely deflected when it traverses at least two domain walls, i.e. a light beam can be largely deflected by passing it through a plurality of contiguous domain walls.

This invention therefore makes it possible to easily construct an electro-optical device, for example an optical deflector (or optical modulator) giving a large deflection angle and high resolving power. Moreover, as it depends on the application of a voltage, it makes fast continuous scan possible even with random access.

As a large deflection angle is obtained based on the aforesaid refractive index difference when the light beam passes through a plurality of domain walls, the light beam can be given a large convergence or divergence which is suitable for a variable focal length lens. In this lens, the focal length may be varied, or the light beam made to converge or diverge, by an electrical signal without any need of mechanical displacement.

In the case of a mirror, as a large deflection is obtained due to the aforesaid refractive index difference by applying a voltage, beam transmission and reflection may be achieved by switching the voltage on and off, and the reflection effect increased when the beam passes through a plurality of domains. This mirror may thus be made to appear and disappear by an electrical signal without any need of mechanical displacement.

Further, according to the electro-optical device of this invention, the propagation direction of a light beam in the device may be kept parallel to the aforesaid principal surfaces by so selecting the shape of the domain walls that at least one of these walls is substantially perpendicular to the aforesaid principal surfaces of the substrate, hence beam propagation in the device is stable.

BRIEF DESCRIPTION OF THE DRAWINGS

FIG. 7 is a schematic oblique view showing a preferred domain shape in this optical deflector.

DESCRIPTION OF PREFERRED EMBODIMENTS

Figure 1:
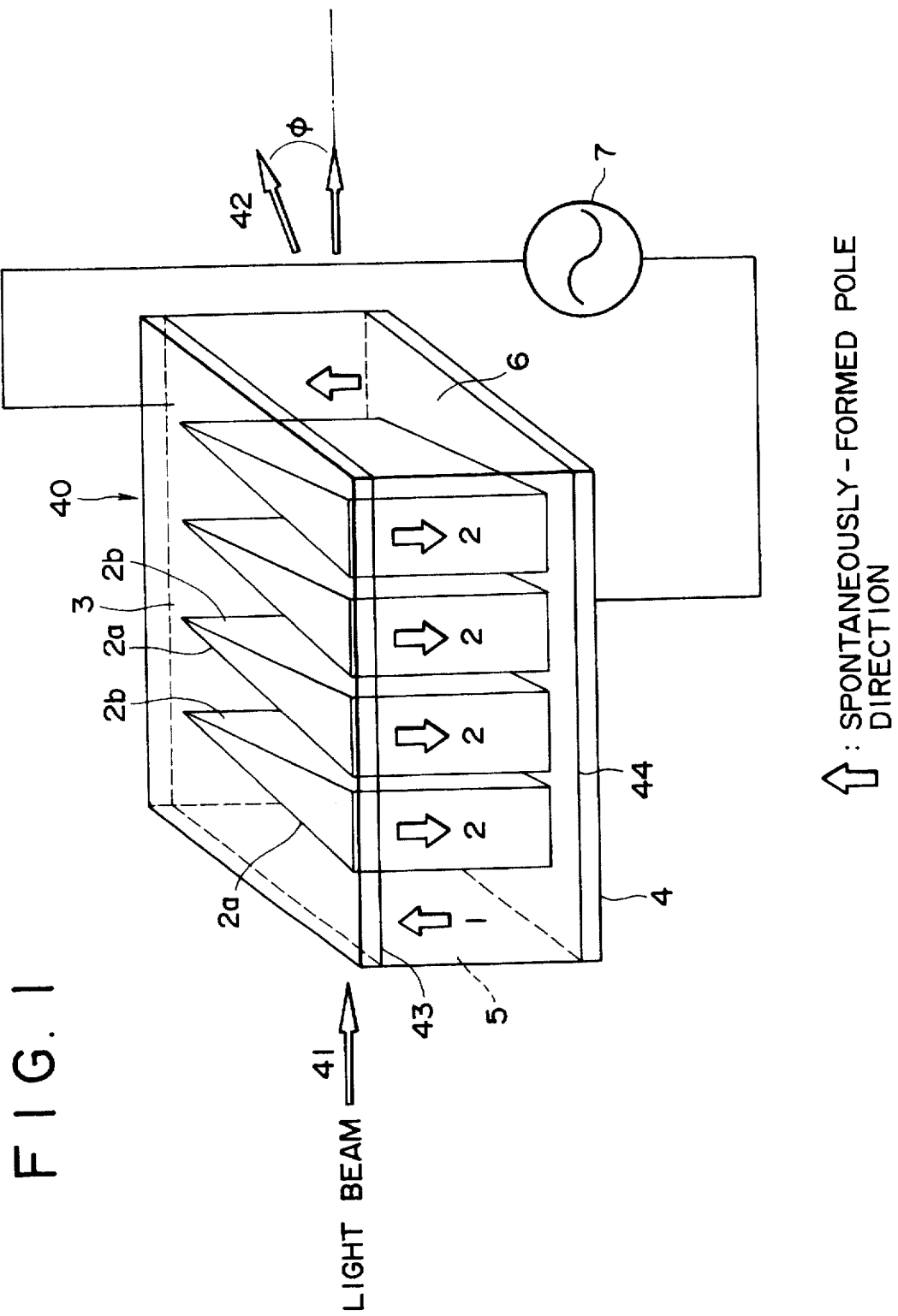
FIG. 1 is a schematic oblique view of an optical deflector according to an embodiment of this invention.

In the electro-optical device of this invention, it is desirable that there are at least two domain walls having opposite inverted domains horizontally traversed by a propagated light beam on each of which the beam has different incidence angles, this beam being deflected according to a voltage applied between electrodes provided on the two opposite principal surfaces of a substrate.

It is particularly suitable for the aforementioned mirror that the domain walls are laminated with a predetermined period so that the light beam is incident at a predetermined angle, the propagation direction of the beam being varied by applying a voltage between electrodes on the two opposite principal surfaces of the substrate.

Further, it is particularly suitable for the aforementioned variable focal length lens that there are at least two domain walls in the beam propagation direction being convex and concave in this direction, the beam being made to converge or diverge by applying a voltage between electrodes on the two opposite principal surfaces of the substrate.

Processing may be performed in both of two mutually perpendicular directions x, y in a section at right angles to the beam propagation direction, by passing the beam through an electro-optical device which processes it in the x direction, and an electro-optical device which processes it in the y direction.

In this case, when a plurality of the aforesaid electro-optical devices are provided, the light beam emission edge of the first device and the light beam incidence edge of the second device being disposed such that they are contiguous and the principal surfaces of the two devices are mutually perpendicular, the beam is deflected or made to converge or diverge in two directions.

When the aforesaid plurality of electro-optical devices are disposed via means having a function for interchanging the two perpendicular directions x, y in a section at right angles to the propagation direction of the beam, it is desirable that a first electro-optical device and a second electro-optical device are arranged such that their respective principal surfaces are parallel to each other.

When the polarization direction of the beam is deflected such that it is perpendicular to a principal surface of the substrate, and the beam is deflected so that it is perpendicular to the beam propagation direction and also perpendicular to the initial beam propagation direction, the x, y directions in a section at right angles to the initial beam propagation direction may be interchanged.

When electrodes are provided over substantially the whole area of opposite principal surfaces, and the beam propagation direction is changed according to a voltage applied between these electrodes, the beam propagation direction may be maintained parallel to the substrate so that unnecessary divergence of the beam is prevented.

When the substrate comprises crystals of $LiNb_xTa_{1-x}O_3$, (where $0 \leq x \leq 1$), and one side of the domain walls is parallel to a mirror plane of the crystals, the flatness of the domain walls is improved and a good deflection may therefore be obtained. This is therefore a desirable construction.

When the aforesaid inverted domains are formed, electrodes are for example provided on both of the principal surfaces of the substrate, an electrode having a predetermined shape provided on at least one of the principal surfaces, and the inverted domains formed in a predetermined configuration by applying a voltage between the two principal surfaces (the poles are reversed in a predetermined configuration).

Alternatively, the inverted domains are formed in a predetermined configuration by irradiating the surface of the negative pole of spontaneous polarization of the substrate, with an electron beam or with charged particles having a negative charge (the poles are reversed in a predetermined configuration).

Alternatively, the inverted domains are formed in a predetermined configuration by irradiating the surface of the positive pole of spontaneous polarization of the substrate, with an electron beam or with charged particles having a positive charge (the poles are reversed in a predetermined configuration).

When, in the electro-optical device of this invention, an electrode having a predetermined shape is formed on at least one of the principal surfaces of the substrate and the poles are reversed in a predetermined electrode configuration by applying a voltage between the electrodes, when at least the electrode on one of the principal surfaces is polygonal, and when at least one side of this electrode is parallel to a mirror plane of the crystals forming the substrate, the side of the domain wall on which the light beam is incident is parallel to this mirror direction so that the flatness of the domain wall is improved.

In this case, the substrate may consist of $LiNb_xTa_{1-x}O_3$ crystals (where $0 \leq x \leq 1$).

Embodiments

This invention will now be described in detail with reference to specific embodiments.

Case of Optical Deflector

First, an embodiment will be described where this invention is applied to an optical deflector using an electro-optical effect.

When a light beam passes from a medium having a certain refractive index into a medium of different refractive index, its path is bent by refraction between the two media. If the media have an electro-optical effect, the refraction angle varies due to the variation of refractive index of the media which depends on an electrical signal, and therefore the path of the beam is bent according to the signal.

As shown in FIG. 1, an optical deflecting device 40 according to this embodiment basically comprises a ferroelectric substrate 1, a plurality of inverted domains 2 formed inside this substrate, electrode films 3, 4 coated on two principal surfaces of the substrate, and an electrical signal generator 7 for applying a voltage between these electrodes.

Figure 2A:
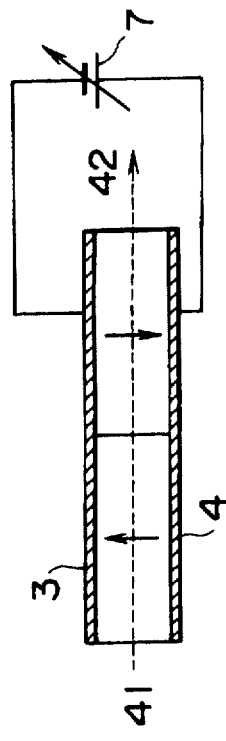
FIG. 2 is a diagram for the purpose of explaining the functional principle of the aforesaid optical deflector.
Figure 2B:
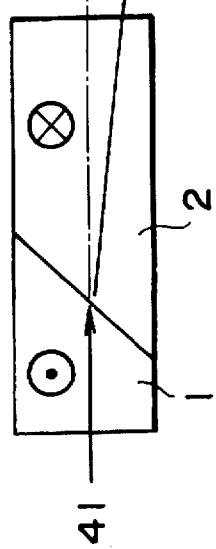
Figure 2C:
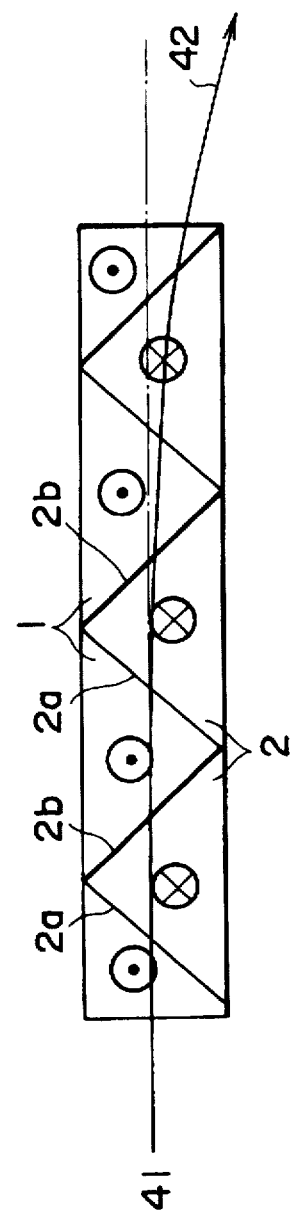

The direction of the crystals of the substrate 1 (direction of spontaneous polarization shown by the upward arrows in the diagram) and the direction of the crystals of the domain 2 are at 180' to each other, as shown in FIG. 1 (and FIG. 2). At least one (herein, both) of the domain walls 2a, 2b of the domain 2 are substantially perpendicular to the principal surfaces 43, 44 of the substrate 1, and a light beam 41 passes through at least two of the domain walls (i.e. 2a→2b→2a ...).

As shown in FIG. 1 (and FIG. 2), the beam 41 enters the device from an end face 5, passes alternately through the substrate 1 and domains 2, and emerges from an end face 6 on the opposite side. The travel direction of an emergent beam 42 is altered relative to the travel direction of the beam 41 by an angle phi due to a refractive index variation which depends on a signal voltage applied between the electrodes 3 and 4 by the signal generator 7.

The magnitude of the refractive index variation of crystals having an electro-optical effect is directly proportional to the magnitude of the field applied to the crystals, and when the direction of the applied field is reversed by 180', the signal of the refractive index variation also changes.

As the direction of the crystals in the substrate 1 and domain 2 are at 180' to each other, a refractive index variation is produced between the substrate 1 and domain 2 according to the signal voltage applied between the electrodes 3, 4, and the bending angle of the beam also varies accordingly.

FIG. 2 schematically shows the operation of the device according to this embodiment. After the beam 41 enters the domain 2 of which the pole is reversed compared to that of the substrate crystals 1, the refractive index changes due to the signal voltage of the signal generator 7 (bending angle changes), and the emergent beam 42 is therefore deflected from the original path (the deflection direction is however opposite to that of FIG. 1 due to the polarity of the voltage). In this case the beam passes through a plurality of the domains 2, so the bending angle changes on each occasion, and the beam 42 which is finally obtained is deflected at a considerably large angle.

As described hereinafter, using semiconductor lithography techniques, high precision, fine structures can be manufactured. According to this embodiment, by fabricating a plurality of deflecting prisms in the form of domains inside a single device, a large deflecting angle may thus be obtained by an extremely simple process which could not be achieved with a single prism, and without the need for complex mechanical procedures such as cutting, polishing and sticking. There is also no need for concern regarding "peeling" of prisms, or peeling of electrode films due to application of the electric field, as in the overlapping prism method.

Figure 3:
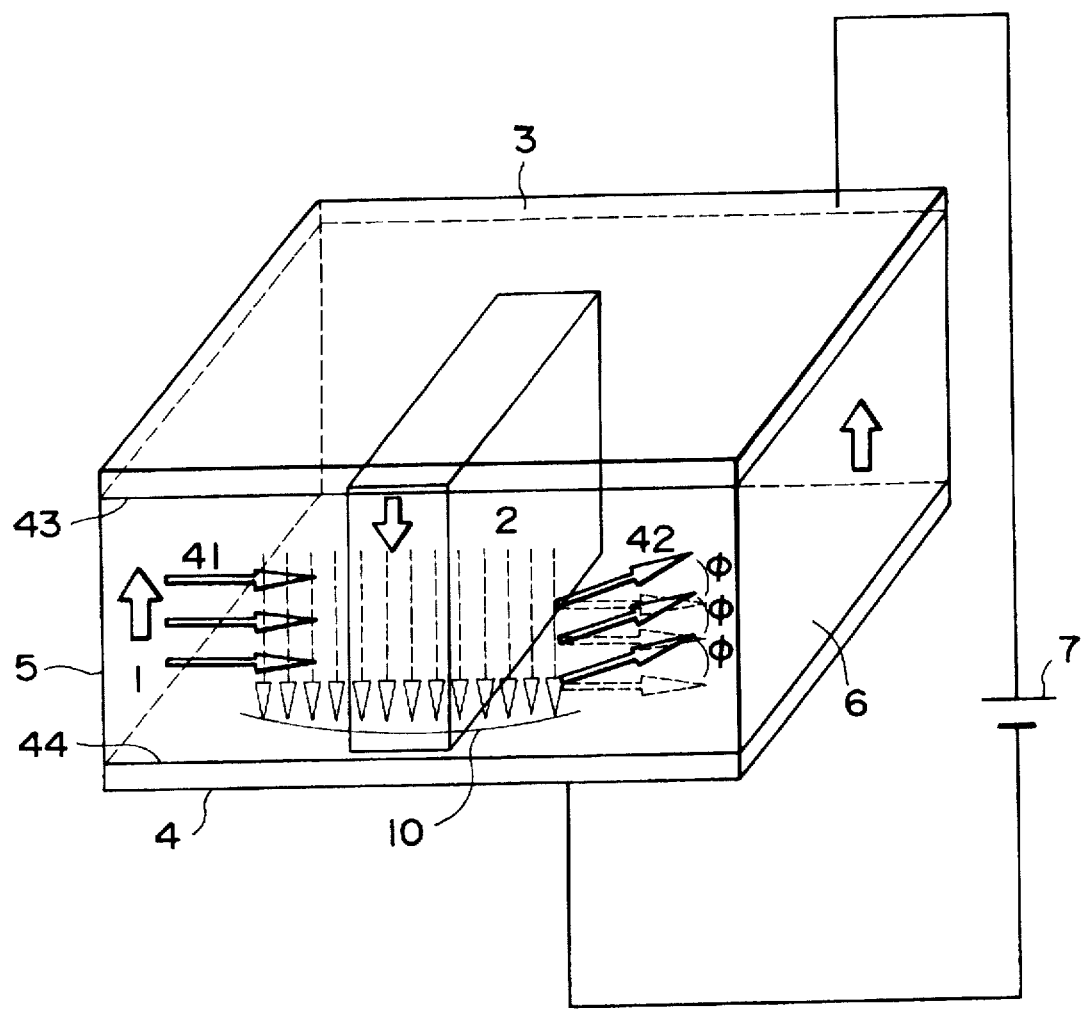
FIG. 3 is a schematic oblique view of an optical deflector using an electro-optical effect in single domain crystals.

According to this embodiment, as shown in principle by a single domain in FIG. 3, the domain wall is perpendicular to the principal surfaces 43, 44, and as the electrodes 3, 4 are formed over the whole area, electric lines of force 10 between the electrodes are effectively parallel to the principal surfaces 34, 44. As a result, the travel direction of the beam 41 is always maintained parallel to the principal surfaces 43, 44, and unnecessary divergence of the beam is prevented.

Figure 4:
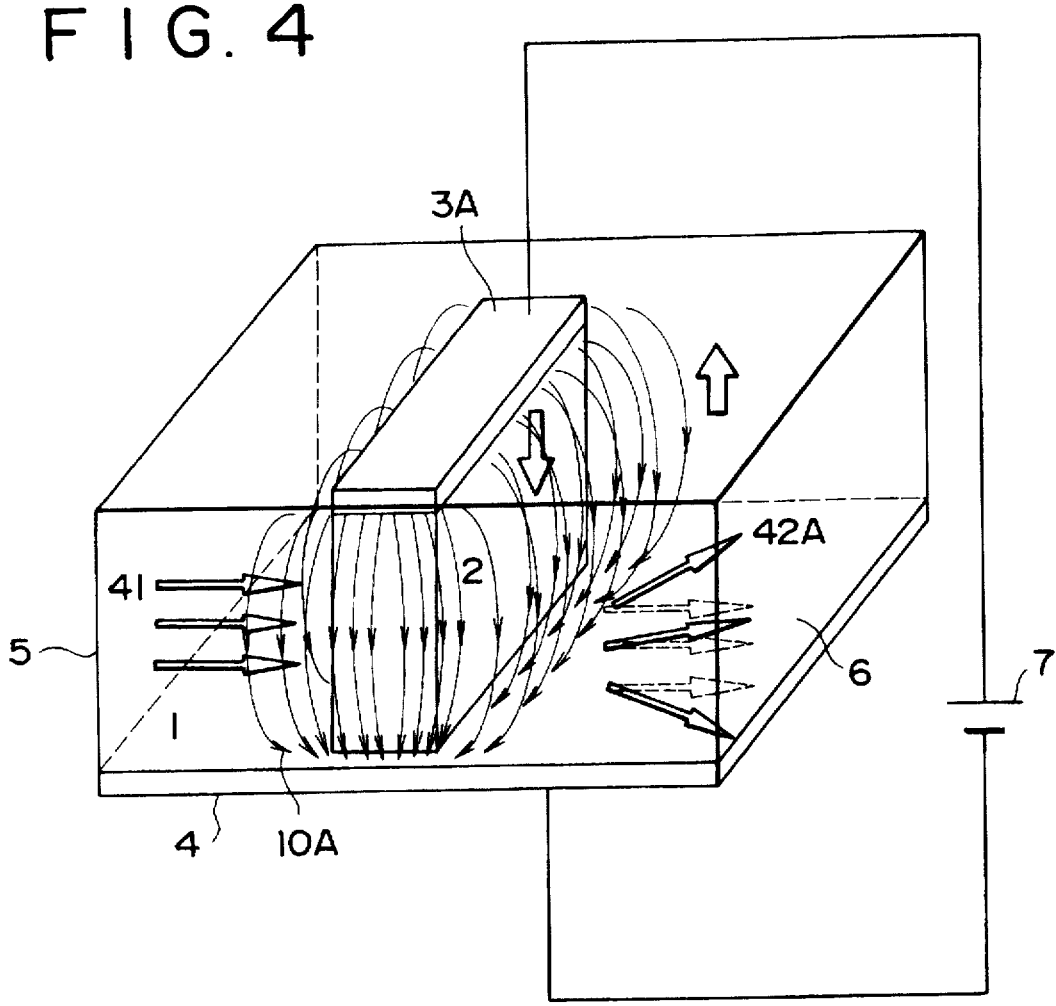
FIG. 4 is a schematic oblique view of an optical deflector according to this invention using an electro-optical effect in single domain crystals.

On the other hand in the case of FIG. 4, an electrode 3A is patterned with the same shape as that of the domain 2. This is an optical deflecting device in which the refractive index is made to vary only in a part where a voltage is applied to single domain crystals, however here, electric lines of force 10A at the edges of the electrode 3A bend. The refractive index distribution is therefore deformed, and a beam 42A tends to be bent unnecessarily.

FIG. 3 shows the principle of the preferred form of electro-optical device according to this embodiment. Uniform electric lines of force 10 are obtained by coating the electrodes 3, 4 onto the whole of the device. Further, by selecting a domain having a wall perpendicular to a principal surface of the substrate 1, the boundary between different refractive indices is made perpendicular to the principal surface of the substrate. Hence, even when the light traverses areas of different refractive index, its travel direction is always maintained parallel to the principal surfaces of the device and unnecessary divergence of the beam is prevented.

According to this embodiment, as described hereinafter, a domain having a wall perpendicular to a principal surface of the substrate 1 is obtained by selecting $LiNb_xTa_{1-x}O_3$ (where $0 \leq x \leq 1$) or $KTiOPO_4$ (KTP) as a material of the substrate 1.

When the beam is deflected, it must be deflected at the same angle over the whole area of the section at right angles to the beam travel direction, so the domain wall has to be very flat over the whole area of the beam cross-section.

In particular, when $LiNb_xTa_{1-x}O_3$ (where $0 \leq x < 1$) is chosen as the substrate material, the flatness of the domain wall may be improved by choosing one side of the domain wall on which the beam is incident, to be parallel to a mirror plane of the crystals of the substrate.

Next, the case of a lithium niobium oxide ($LiNbO_3$) substrate will be described as an example of the design of an optical deflector according to this invention.

Regarding the shape of the domain 2 formed in the substrate 1, a fundamental physical constant of lithium niobium oxide ($LiNbO_3$) is a refractive index $n_0=2.200$ for abnormal light of wavelength 632.8 nm. Using an electro-optical constant $r_{33}=30.8 \times 10^{-12}$ m/V, assume that the wavelength of the beam is $\lambda=632.8$ nm and that polarization is in the direction of the spontaneous polarization of lithium niobium oxide ($LiNbO_3$) (c axis).

The refractive index variation when a field E (V/m) is applied between the electrodes 3, 4 is:

$$\Delta n_0 = (1/2) \cdot n_0^3 \cdot r_{33} \times E \quad (1)$$

When a light beam enters a medium 2 of refractive index $n_2$ from a medium 1 of refractive index $n_1$ at an incidence angle $\theta_1$, and the emission angle from the medium 1 to the medium 2 was $\theta_2$, this relation may be expressed by Snell's law:

$$\sin \theta_1 / \sin \theta_2 = n_2/n_1 \quad (2)$$

Figure 5:
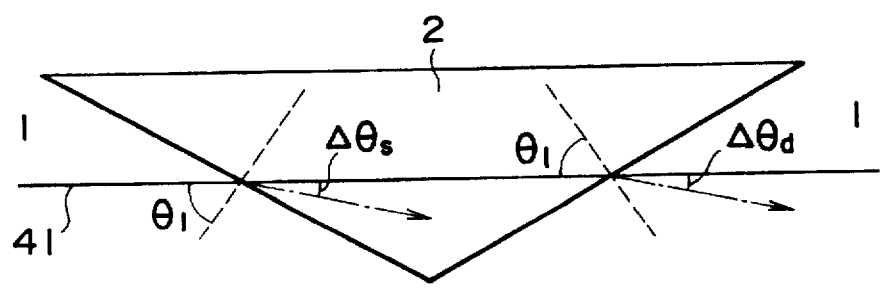
FIG. 5 is a schematic plan view showing a domain shape and beam deflection angle in this optical deflector.

From equation (2), it is seen that when a field is applied to the electrodes 3, 4 shown in FIG. 1 such that the electrode 3 is at a high potential, the refractive index of the substrate 1 is $n_0 + \Delta n_0$, and the refractive index of domain 2 is $n_0 - \Delta n_0$, the deflection angle $\Delta \theta_s$ relative to the incidence angle $\theta_1$ from the substrate 1 to the domain 2 (FIG. 5) is:

$$\Delta \theta_s = \sin^{-1}[\{(n_0 - \Delta n_0)/(n_0 + \Delta n_0)\} \times \sin \theta_1] - \theta_1 \quad (3)$$

Also, the deflection angle $\Delta \theta_d$ relative to the incidence angle $\theta_1$ from the domain 2 to the substrate 1 (FIG. 5) is:

$$\Delta \theta_d = \sin^{-1}[\{(n_0 - \Delta n_0)/(n_0 + \Delta n_0)\} \times \sin \theta_1] - \theta_1 \quad (4)$$

Figure 6A:
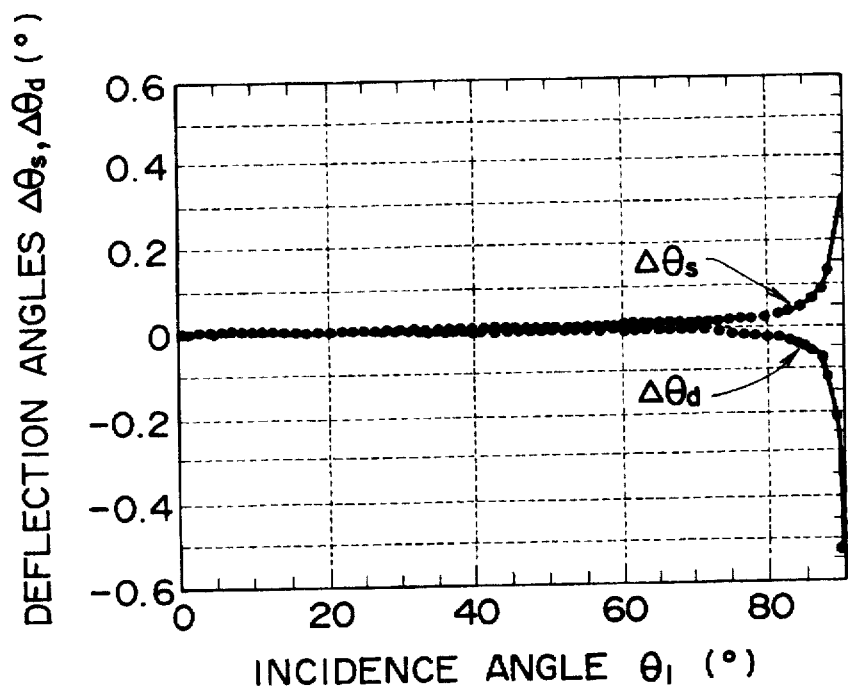
FIG. 6A is a graph showing a deflection angle variation relative to a domain incidence angle.

From equations (1), (3), (4), FIG. 6A shows $\theta_s$ and $\theta_d$ for lithium niobium oxide ($LiNbO_3$) when a field E=500,000 V/m is applied to the device.

According to this, it is seen that larger incidence/emission angles to the domain 2 give a larger deflection angle, and particularly that an incidence angle of 75 degrees or more is preferable. Herein, when $\theta_1$ is chosen to be 85°, the deflection angle ($|\Delta \theta_s| + |\Delta \theta_d|$) is approximately 0.1°.

It is to be preferred that, as far as possible, the other side of the domain 2 is parallel to the beam so that there is no input/output of light. It is also desirable that the shape of the domain 2 is triangular, as shown for example in FIG. 5 and FIG. 7.

Figure 6B:
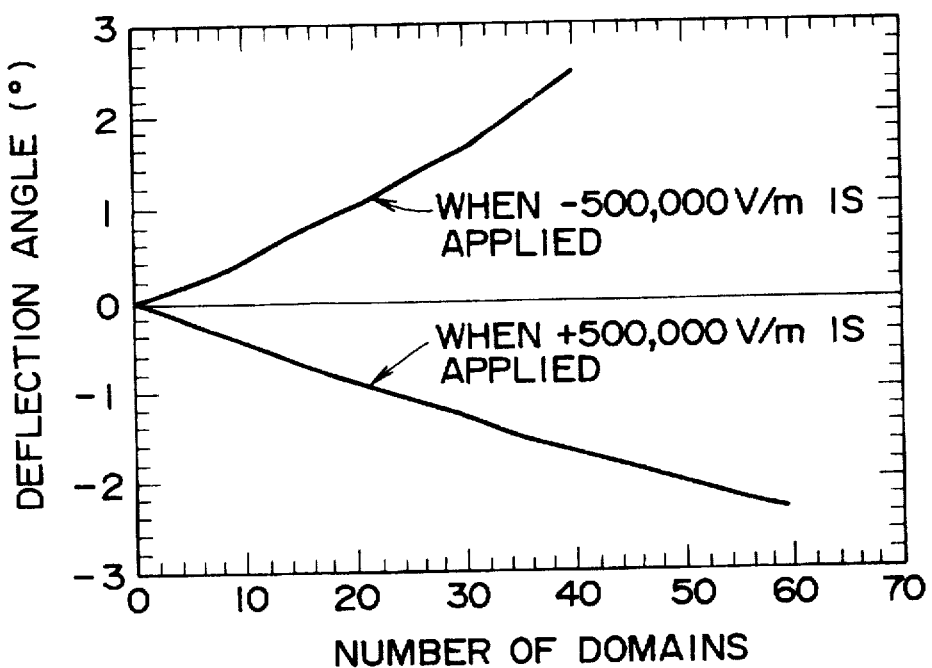
FIG. 6B is a graph showing a deflection angle variation due to a number of domains, in this optical deflector.

If about ten of these domains 2 are disposed in the travel direction of the beam, the deflection angle increases each time it traverses one of the domains 2 so that finally, a relatively large deflection angle of about 1' is produced. FIG. 6B shows the relation between the number of domains and deflection angle.

Next, it will be described how the deflection angle may be further increased by choosing the angle of the emergent end face 6 of the device.

Figure 8:
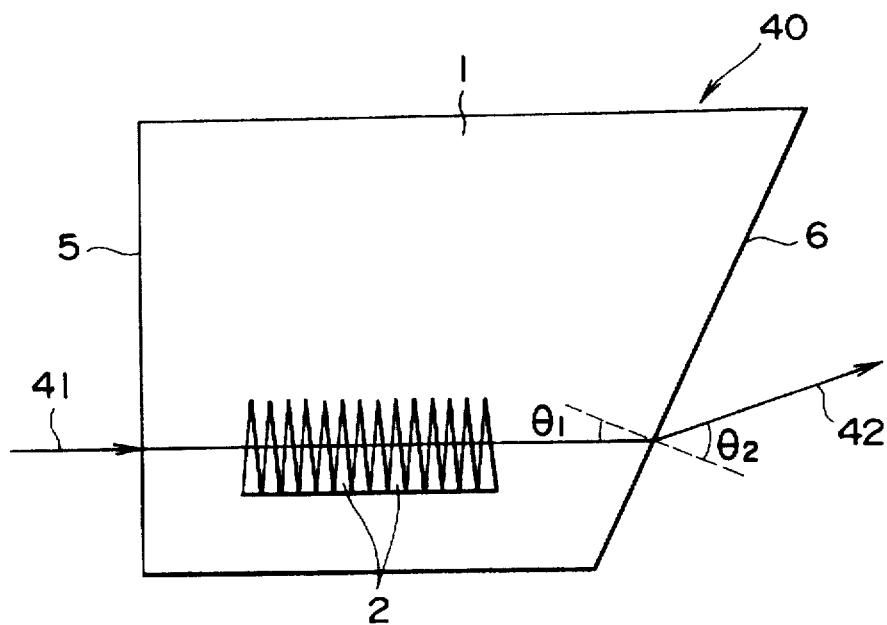
FIG. 8 is a plan view of essential parts showing a specific form of this optical deflector.
Figure 9:
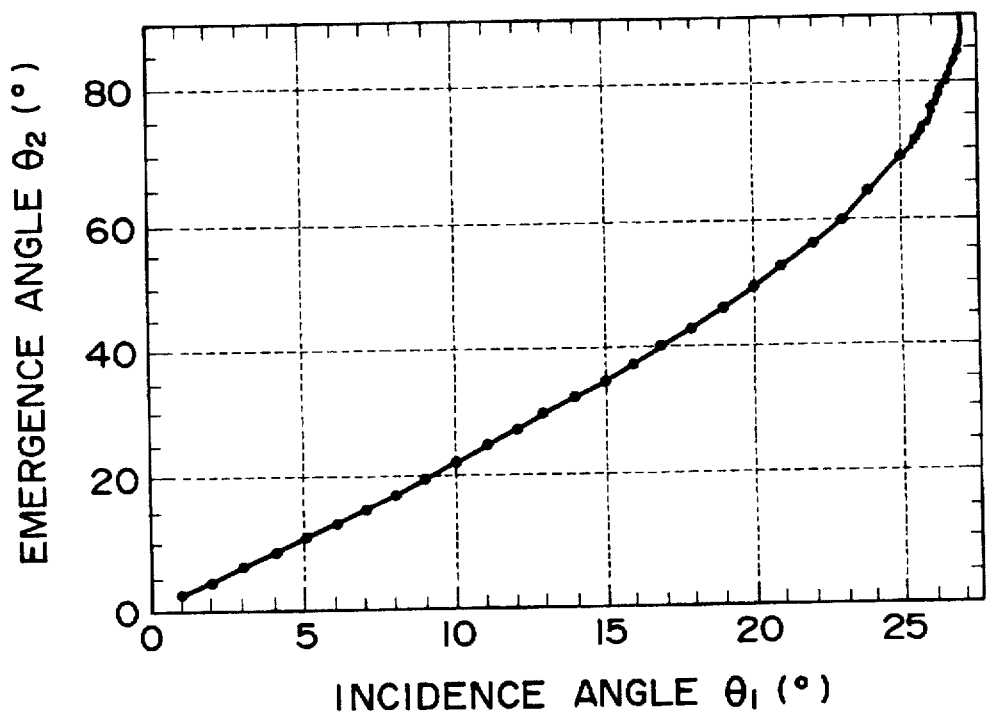
FIG. 9 is a graph showing an emission angle variation from an emission end face relative to an incidence angle on this emission end face of this optical deflector.

As the refractive index $n_1$ of lithium niobium oxide is 2.200 and the refractive index $n_2$ of air is 1, (LiNbO$_3$), the relation between the incidence angle $\theta_1$ from the interior of the device to the emergent end face 6 and the emission angle $\theta_2$ from the end face 6 to the atmosphere shown in FIG. 8, is as shown in FIG. 9 from equation (2).

When the incidence angle $\theta_1$ is set large up to a critical angle (27°), the deflection angle may be considerably increased. For example, when the incidence angle $\theta_1$ is 26°, and the deflection angle of a beam incident on the emission end face 6 is 1 degree, the beam emerging from the device is given a large deflection angle of approximately 6°.

Hence, the device 40 having a large deflection angle may be manufactured by suitably designing the shape of the domain 2 and the angle of the emission end face 6.

Figure 10:
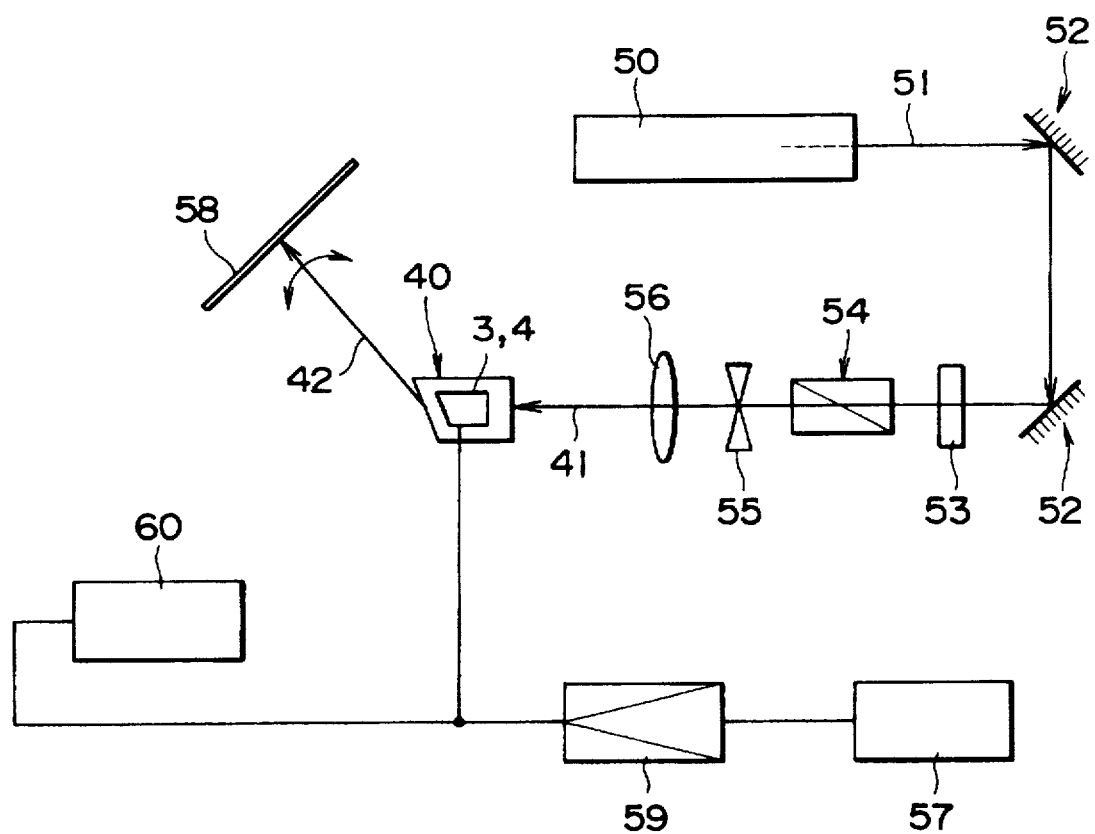
FIG. 10 is a schematic view of an optical deflection system using this optical deflector.

As shown in FIG. 10, the optical deflector 40 according to this embodiment may be used as an optical system. This system may be applied in a variety of situations such as a laser scan display device, laser cutter or laser printer.

In this optical system, a laser beam 51 from a He-Ne laser 50 is reflected by mirrors 52, its phase is adjusted by a ½ λ plate 53, it is converted to the beam 41 having a predetermined polarization component by a polarizer 54, this beam impinges on the optical deflector 40 (corresponding to the device shown in FIG. 8) via an iris 55 and lens 56, the beam is deflected by applying a signal voltage from a signal generator 57, and the deflected beam 42 is thus made to scan an object 58 such as a screen. The signal voltage is amplified to a desired level by an amplifier 59, and its voltage is measured by a voltmeter 60.

Next, some methods of manufacturing the aforesaid optical deflector 40 will be described.

To manufacture the device, the domains 2 are formed, the electrodes 3, 4 are formed, the edge faces 5, 6 are polished and then coated with a non-reflecting coating 6. Each of these processes will now be described in detail.

Figure 11:
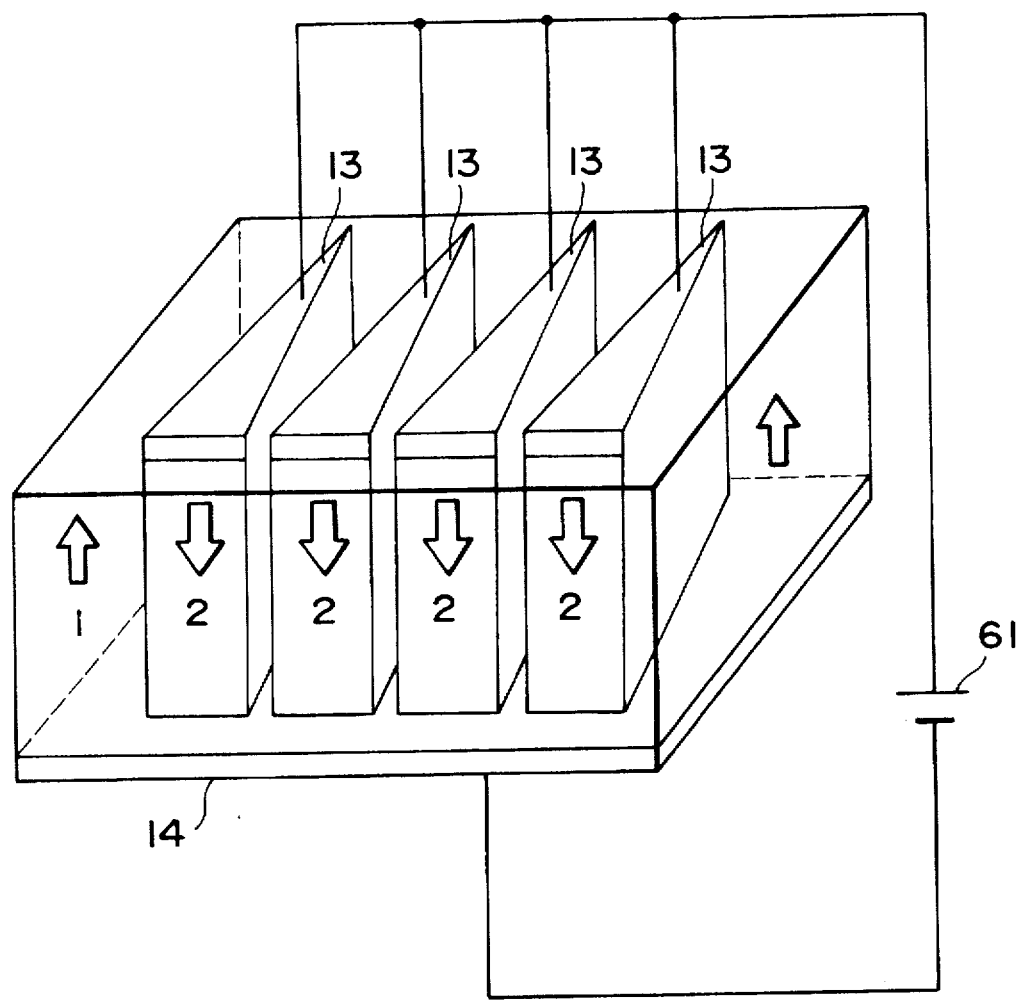
FIG. 11 is a schematic oblique view showing a method of forming domains by applying an electric field.

According to a first method, the domains 2 are formed, for example, by applying an electric field to the substrate 1 of lithium niobium oxide (LiNbO$_3$) as conceptually shown in FIG. 11. Triangular electrodes 13 or electrodes of another shape are formed by coating an aluminum films by ordinary lithographic techniques on a +z face (+c face) of a z plate 1 of lithium niobium oxide (LiNbO$_3$), and a flat electrode 14 is formed on a −z face (−c face) of the z plate 1. An electric field of 20 kV/mm or more is then applied by the signal generator 61 so that the electrodes 13 on the +z face are at a higher potential than the electrode 14 on the −z face.

A plurality of the inverted domains 2 are thereby formed with effectively the same pattern as the electrodes 13 immediately beneath the electrodes 13 so as to produce the device 40 as shown in FIG. 1. In this case, the flat electrode 3 is coated after removing the electrodes 13, but the flat electrode 3 may also be coated on the electrodes 13 without removing them.

A similar method to the method of forming domains by applying an external electric field shown in FIG. 11, is disclosed in "Simulated Phase Adjusted Waveguide SHG Devices" by Tadahiro Yamada et al, Journal of the Institute of Electronic Information and Communication Engineers of Japan, C-I, Vol. J77-C-1, No. 5, pp.206–213 (1994). The method of this publication, however, relates to SHG devices, and light is attenuated in the electrode area unless all electrodes including inverted electrodes are removed after forming the domains. The optical deflector of this embodiment therefore considerably differs from this type of SHG device in that, although the method of forming the domains is similar, the electrodes are absolutely necessary for varying the refractive index.

Figure 12:
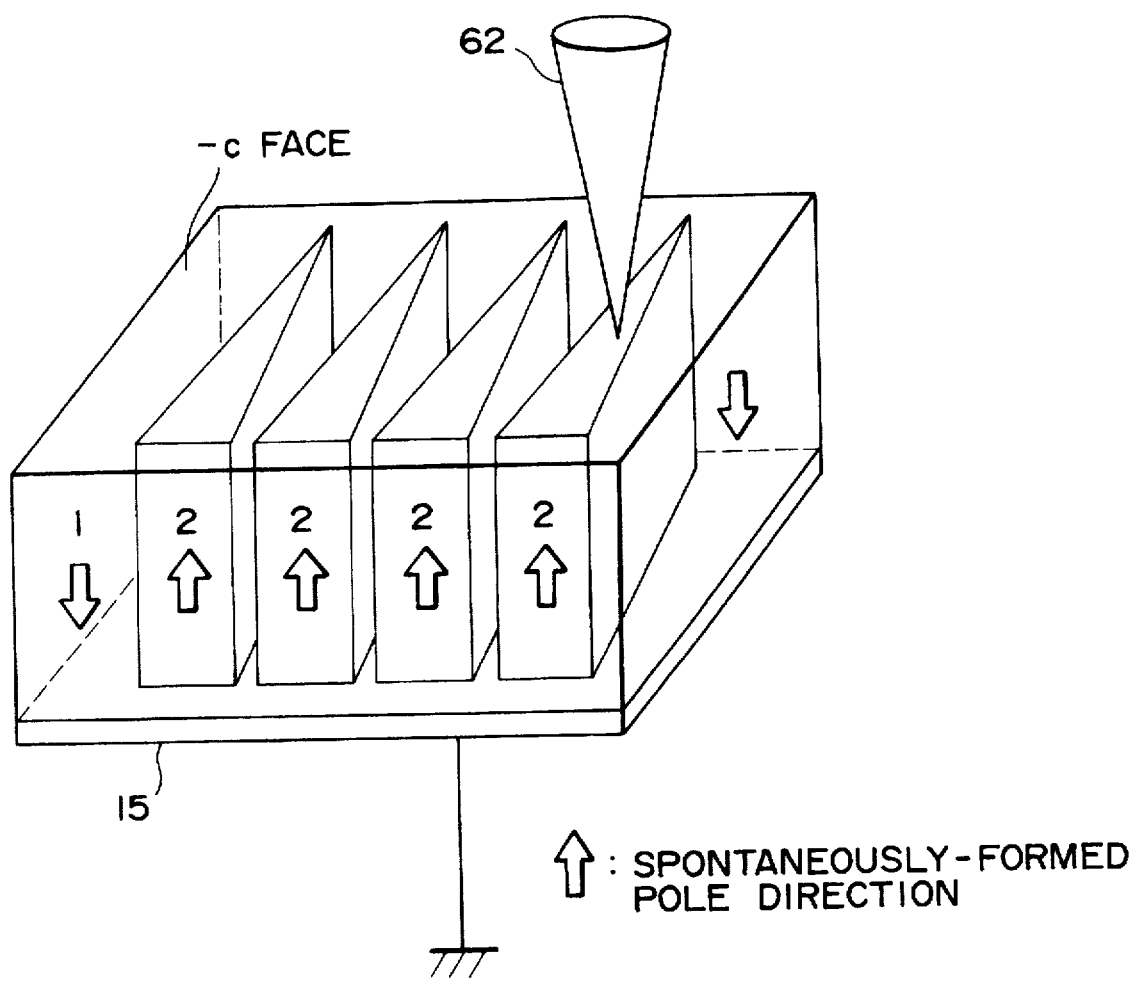
FIG. 12 is a schematic oblique view showing a method of forming domains by electron beam irradiation.

According to another method of forming the domains 2, the lithium niobium oxide (LiNbO$_3$) substrate 1 is irradiated with an electron beam as conceptually shown in FIG. 12. A flat electrode 15 is formed by depositing an Al film on the +z face (+c face) of the z plate 1 of the lithium niobium oxide (LiNbO$_3$), and after earthing, a part where it is desired to form the domains 2 on the −z face (−c face) is scanned and irradiated at room temperature by an electron beam 62 of 20 kV (accelerating voltage)×t (t=thickness t (mm) of the substrate 1).

A plurality of the inverted domains 2 (of which the pole direction is opposite to that of FIG. 11) is thereby formed in a predetermined pattern in the substrate 1. Subsequently, the electrodes 3, 4 are formed on both surfaces of the substrate, however the aforesaid electrode 15 may be allowed to remain.

A similar method to the method of forming domains by electron beam irradiation shown in FIG. 12, is disclosed in "Fabrication of periodically reversed domain structure for SHG in LiNbO$_3$ by direct electron beam lithography at room temperature", Electron. lett., Vol. 27, No. 10, pp. 828–829 (1991). This method however also targets SHG devices.

The aforesaid two domain forming methods are effective for ferro-electric substrates such as LiNb$_x$Ta$_{1-x}$O$_3$ (where $0 \leq x \leq 1$) or KTP.

There are also electric fields in the substrate in which the domains 2 are formed due to deformational stress in their formation and electric fields due to implanted charges. This causes the refractive index of the substrate 1 to vary non-uniformly and makes the substrate less susceptible to the signal field. To avoid this, the substrate is preferably annealed. Lithium niobium oxide (LiNbO$_3$) is heated to a temperature of between 150° C. and 700° C. for several tens of minutes, and lithium tantalum oxide (LiTaO$_3$) to a temperature up to the Curie point for several hours, preferably in an oxygen atmosphere (if not, in air).

Next, a conducting film such as Al, for example, is formed on both sides of the substrate 1 by vapor deposition or sputtering, care being taken not to short circuit the electrodes 3 and 4.

Next, the substrate 1 is cut to a predetermined shape, the end faces 5, 6 are optically polished, and a dielectric material is coated in a plurality of layers by vapor deposition or the like on the two end faces 5, 6 such that it is non-reflecting with respect to the beam to be used so as to complete fabrication of the device.

In this manner, an optical deflector which permits fast random access, gives a large deflection angle and offers high resolution, may be manufactured easily and with high precision.

Case of Variable Focal Length Lens

Next, an example will be described where this invention is applied to a lens of which the focal length may be varied according to an electrical signal.

This variable focal length lens also uses an electro-optical effect. As in the case of the aforesaid optical deflector, when an electric field is applied to domains of which the direction is reversed by 180° relative to the substrate crystal direction, a refractive index difference appears between the domains according to the applied field.

Figure 13:
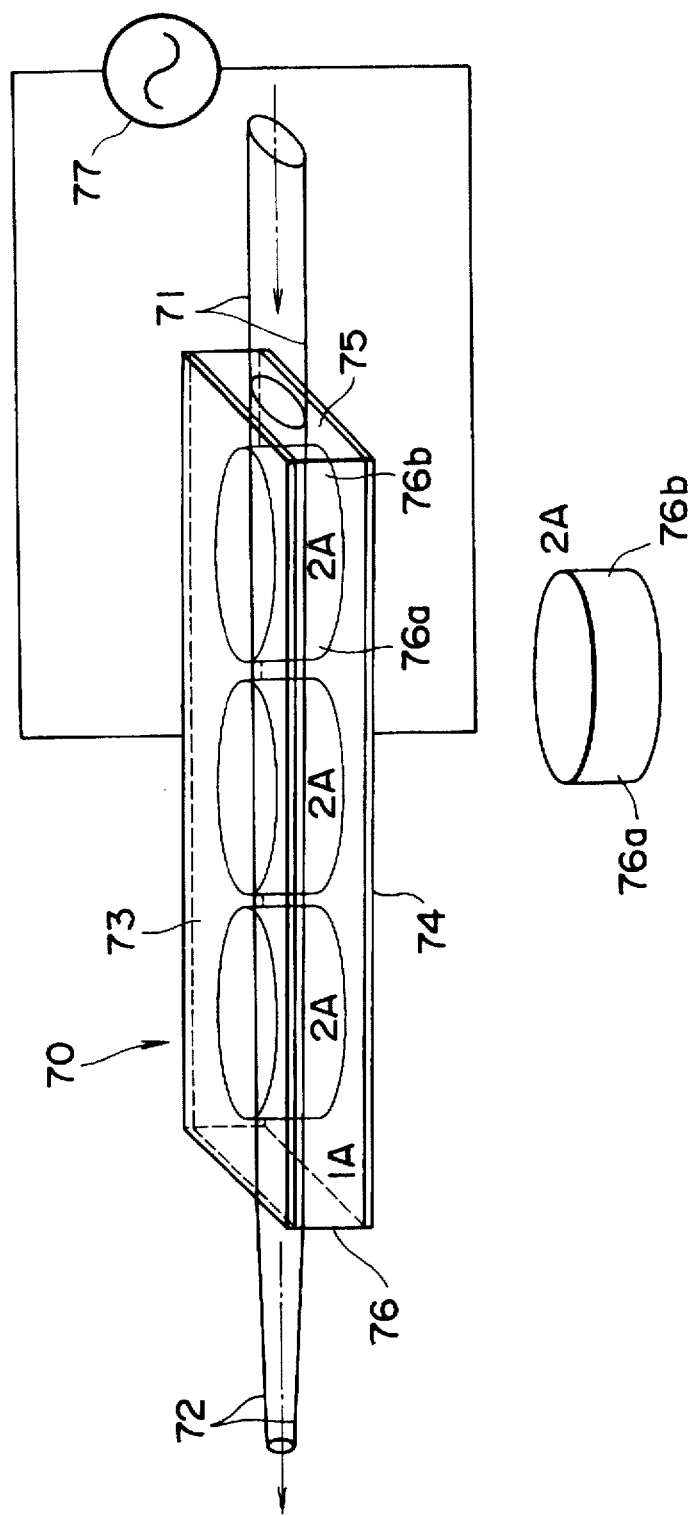
FIG. 13 is a schematic oblique view of a variable focal length lens according to an embodiment of this invention.

As shown in FIG. 13, therefore, a variable focal length lens 70 basically comprises a ferro-electric substrate 1A, a plurality of domains 2A fabricated inside this substrate, electrode films 73, 74 coated on both surfaces 43A, 44A of the substrate, and a converging/diverging signal generator 77 connected between these electrodes.

The direction of the crystals of the substrate 1A and the direction of the crystals of the domain 2A are at 180° with respect to each other as shown in FIG. 1. There are at least two domain walls in the propagation direction of a beam 71 having projection surfaces 76a or depression surfaces 76b relative to this direction, the beam 71 being made to converge or diverge by applying a voltage between the electrodes 73, 74 on the two opposite principal surfaces of the substrate.

The beam 71 is incident on an end face 75 of the device, passes alternately through the substrate 1A and domains 2A, and emerges as a beam 72 from an end face 76 on the opposite side of the device. This beam 72 is made to converge or diverge according to an electrical signal from the signal generator 77.

As the crystal directions of the substrate 1A and domains 2A are at 180° to one another, the refractive index difference described hereinabove appears between the substrate 1A and domains 2A according to the signal voltage applied between the electrodes 73, 74, and the beam is therefore made to converge or diverge accordingly.

Next, a method of designing the variable focal length lens 70 according to this embodiment will be described in the case of a lithium niobium substrate.

Fundamental physical constants of the substrate, electro-optical effects and the laws of refraction are as were described for the aforesaid optical deflector.

Figure 14:
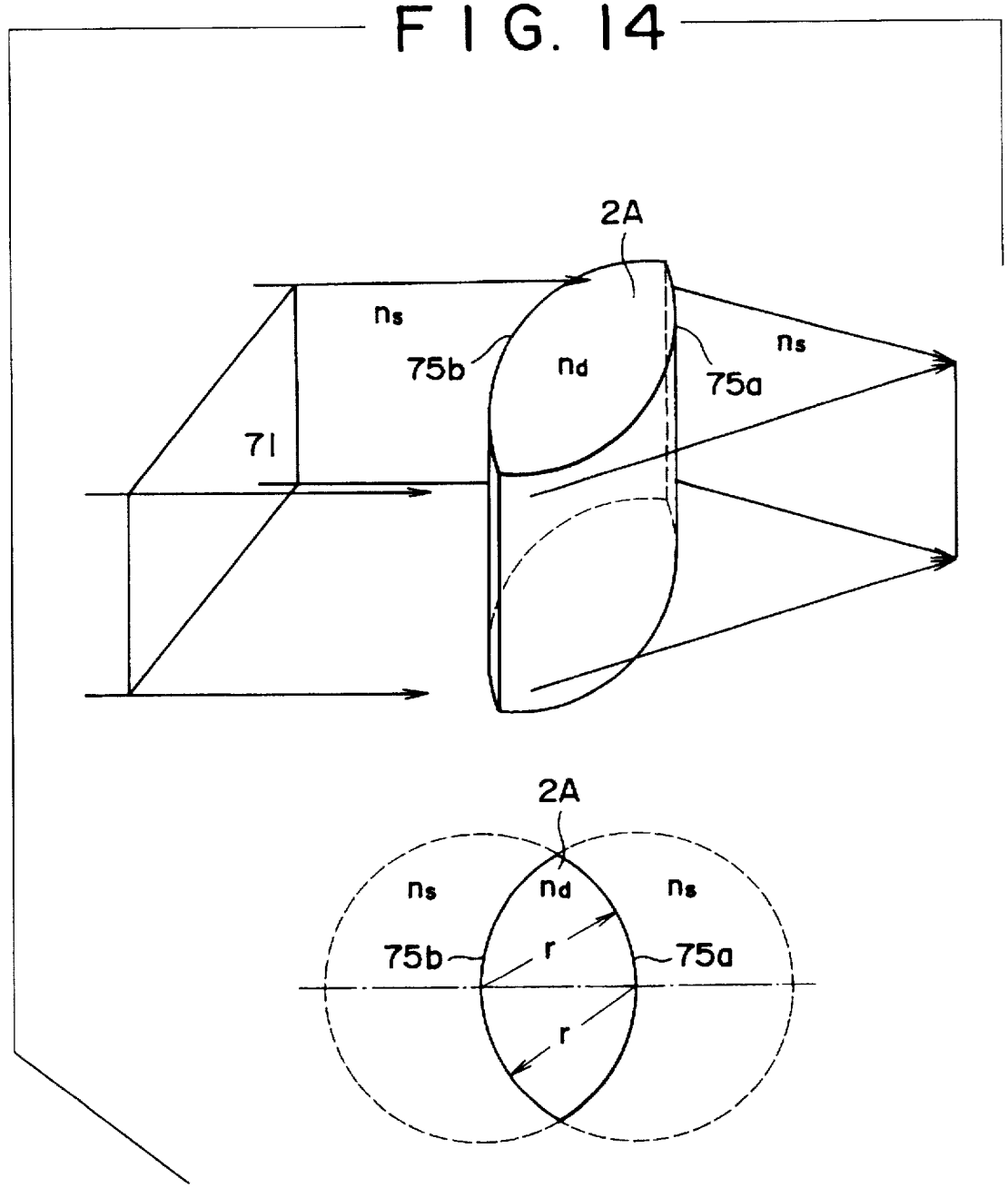
FIG. 14 is a schematic view showing a typical lens shape of this variable focal length lens.

For example, the lenses 2A in the aforementioned domain structure are designed as shown in FIG. 14. If, relative to the travel direction of the beam 71, the radius of curvature r on the front side 76a and the radius of curvature r on the rear side 76b are both 20 µm, the focal length of one lens is:

$$f = n_s \cdot r/(n_d - n_s) \quad (5)$$

where $n_s$, $n_d$ are respectively the refractive indices of the substrate and domains when 50 kV/m is applied.
Substituting:

$$n_s = 2.2 - 8.199 \times 10^{-5}$$

$$n_d = 2.2 + 8.199 \times 10^{-5}$$

in this equation (5) (wavelength λ=0.633 µm), f=approx. 27 cm.

When a plurality of these lenses are disposed as shown in FIG. 13 and the beam is made to pass continuously through them, e.g. through N=300 lenses, the focal length $f_N$ of the overall system is:

$$f_N = f/N \quad (6)$$

=approx. 0.9 mm

The focal length of this lens 70 varies according to the magnitude of the electric field, e.g. when the magnitude of the field is set to zero, all the lenses disappear as far as the beam is concerned (there is no lens effect), and there is no convergence or divergence.

When a field is applied in the reverse direction to the above, the refractive index in the lens part becomes smaller in the opposite sense, so the beam diverges according to the magnitude of the field.

Hence, in the lens 70 according to this embodiment, focal length, convergence and divergence may be varied according to the direction and magnitude of the field, or in other words, a lens having a variable focal length according to a signal field may be realized.

This variable length focal lens 70 may be manufactured easily and with high precision by the same method as that described above for an optical deflector.

Beam Deflection, Convergence or Divergence in 2 Dimensions

The aforesaid optical deflector and lens both produce deflection, convergence and divergence in one dimension, however in the following embodiment, the production of these effects in two dimensions will be described.

Figure 15:
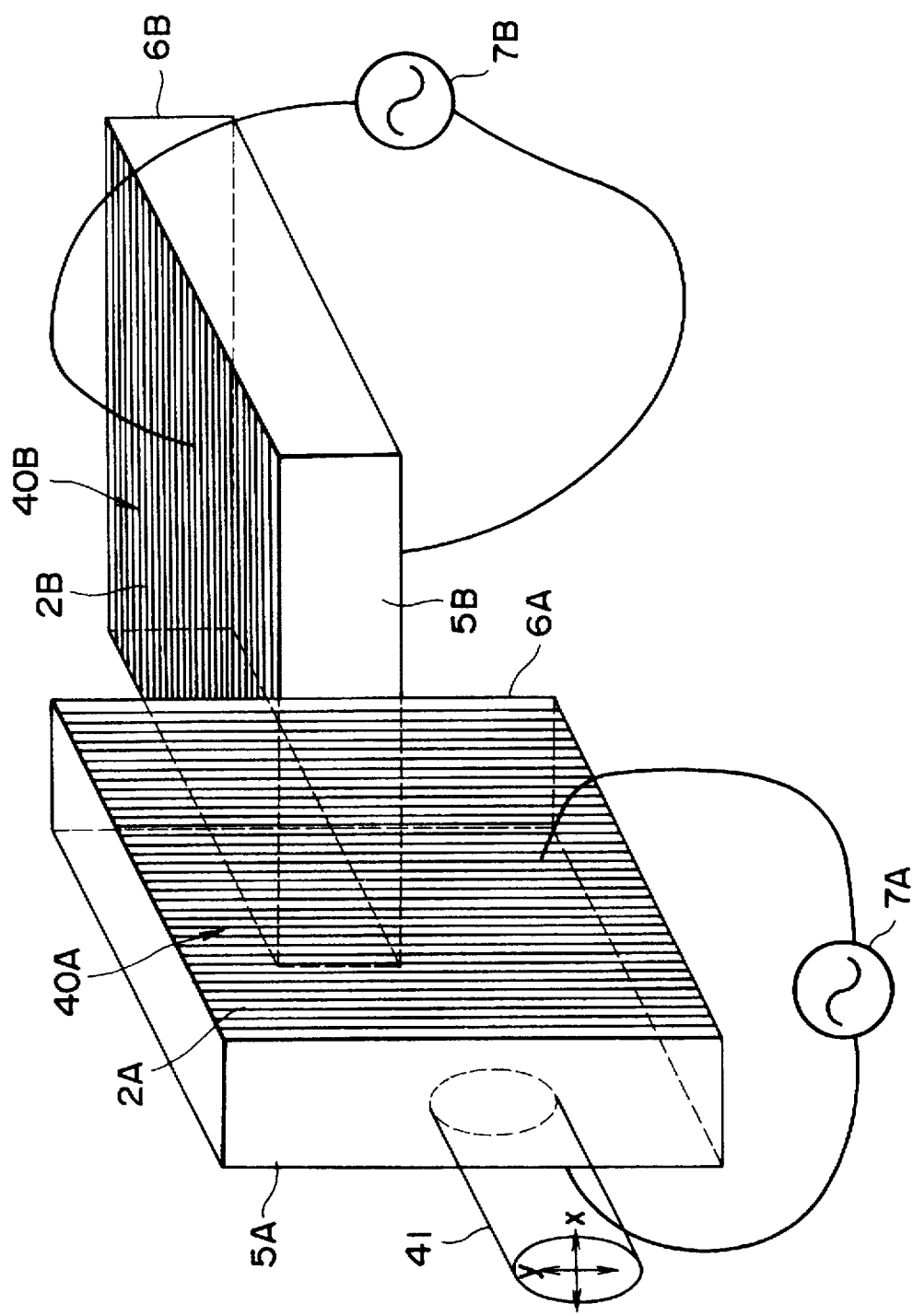
FIG. 15 is a schematic oblique view of a device for 2 dimensional processing of a light beam according to an embodiment of this invention.

In the first method, as shown in FIG. 15, two devices 40 are used, i.e. devices 40A and 40B, an output edge 6A of the former and input edge 5B of the latter being juxtaposed such that the principal surfaces of the devices are perpendicular. In FIG. 15, the aforesaid domains are schematically represented diagrammatically by 2A, 2B in the devices. The electrodes are not shown.

The beam 41 enters the device 40A from an end face 5A, and the beam is deflected or made to converge or diverge in a direction y by a signal voltage from a signal generator 7A. The beam then enters the device 40B from the end face 5B, is deflected or made to converge or diverge in a direction x by a signal voltage from a signal generator 7B, and is output to the outside from an output end face 6B.

Hence, the beam may be processed in two dimensions x, y by passing it through the two perpendicular devices 40A, 40B in succession.

Figure 16:
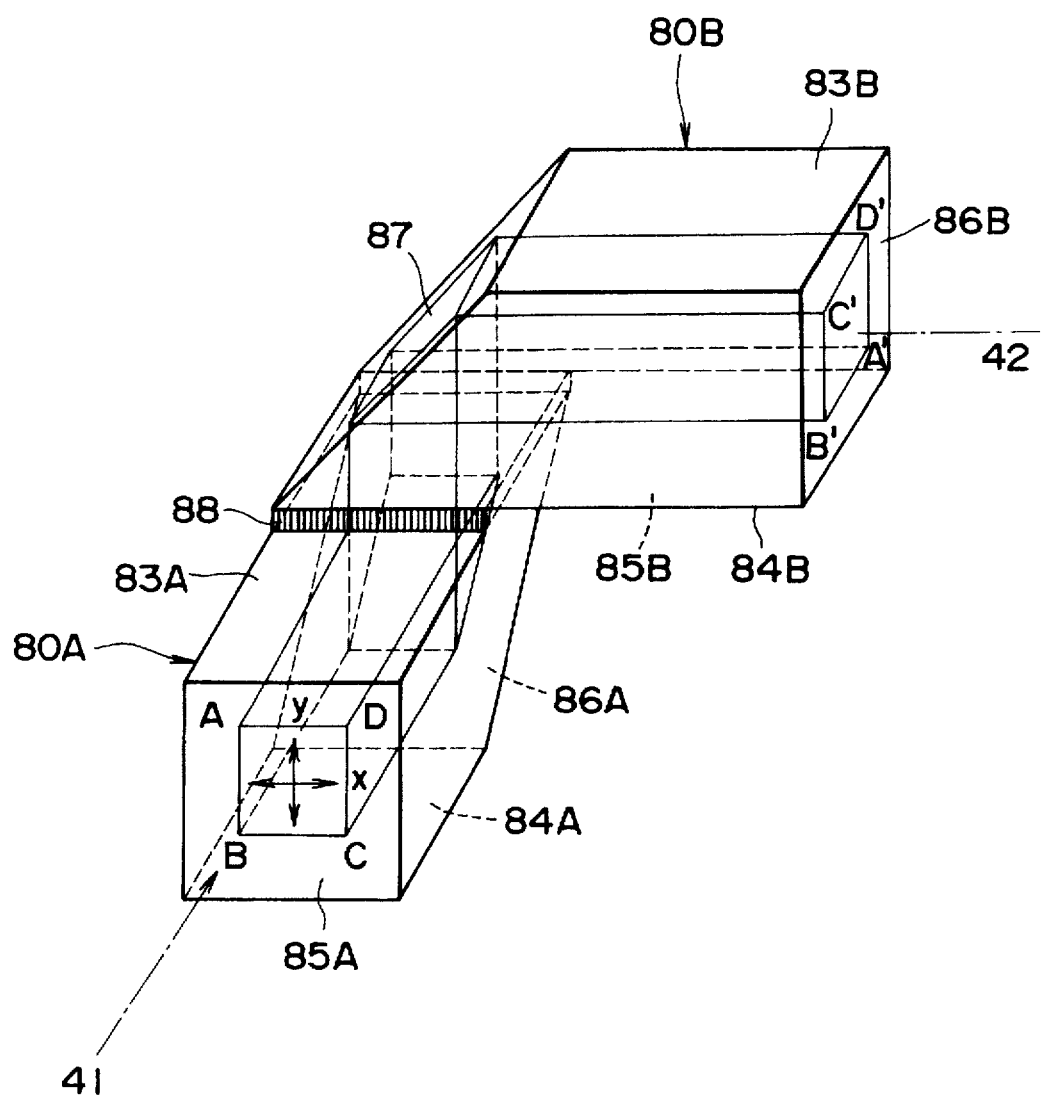
FIG. 16 is a schematic oblique view of another device for 2 dimensional processing of a light beam according to an embodiment of this invention.

Another method of 2 dimensional processing, shown in FIG. 16, is to connect a device 80A for processing the beam in the x direction and a device 80B for processing the beam in the y direction (in FIG. 16, domains or electrodes of which a plurality are aligned in the beam travel direction are not shown), such that they have principal surfaces parallel to each other.

The beam 41 enters from an end face 85A of the device 80A for processing the beam in the x direction, is totally reflected perpendicular to a principal surface of the device 80A by an end face 86A which is optically polished obliquely, enters the device 80B for processing the beam in the y direction from an end face 85B, is totally reflected parallel to principal surfaces 83A, 84A of the device 80A and perpendicular to the beam travel direction in the device 80A by an end face 87 which is optically polished obliquely, is propagated in the device 80B parallel to principal surfaces 83B, 84B of the device 80B, and thus emerges form the end face 86B as the beam 42 which has been processed in the two directions x, y.

The x direction and y direction of the beam may be interchanged by "bending". Referring to FIG. 16, denoting the 4 corners of a beam section on the end face 85A by the symbols A, B, C, D, and tracking rays from these 4 corners, it is seen that the x direction (A–D) of the device 80A is converted to the y direction (A'–D') of the device 80B, and the y direction (A–B) of the device 80A is converted to the x direction (A'–B') of the device 80B. Hence, processing may be performed in the x direction by the device 80A and in the y direction by the device 80B. It will of course be understood that deflection in the devices 80A, 80B occurs each time the beam passes through a domain.

In a device using lithium niobium oxide pole reversion, it is advantageous that the beam polarization direction is perpendicular to the principal surfaces of the substrate. It is therefore desirable to insert a ½ half wave plate 88 between the devices 80A and 80B so that the polarization direction is perpendicular to the principal surfaces of the substrate even in the device 80B. Thus, the beam can be deflected so that it is perpendicular to the beam propagation direction and perpendicular to the initial beam propagation direction, and the directions x, y in a section perpendicular to the initial beam propagation direction can be interchanged.

Case of Electrical Induction Mirror

Figure 17:
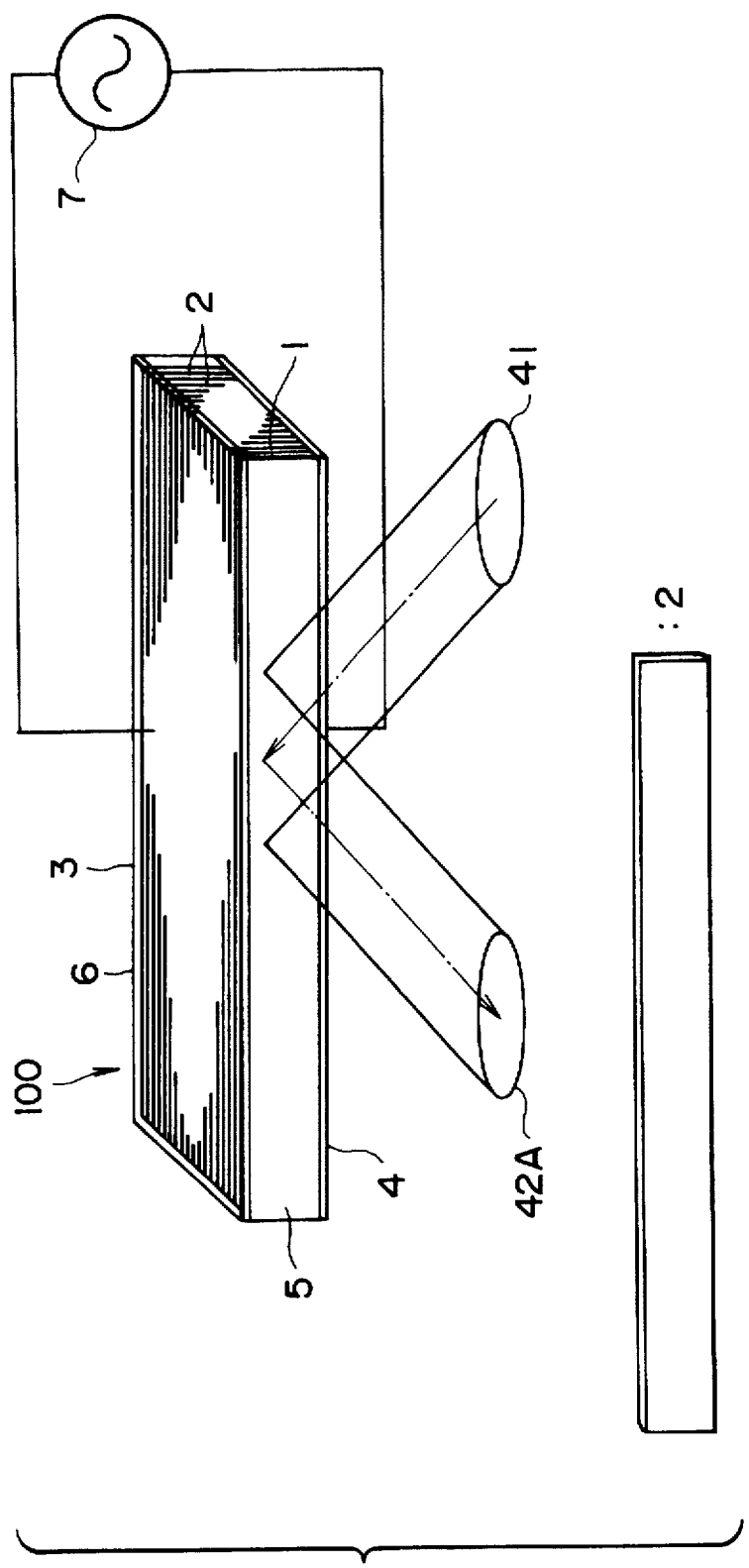
FIG. 17 is a schematic oblique view of an electrical induction mirror according to an embodiment of this invention.
Figure 18:
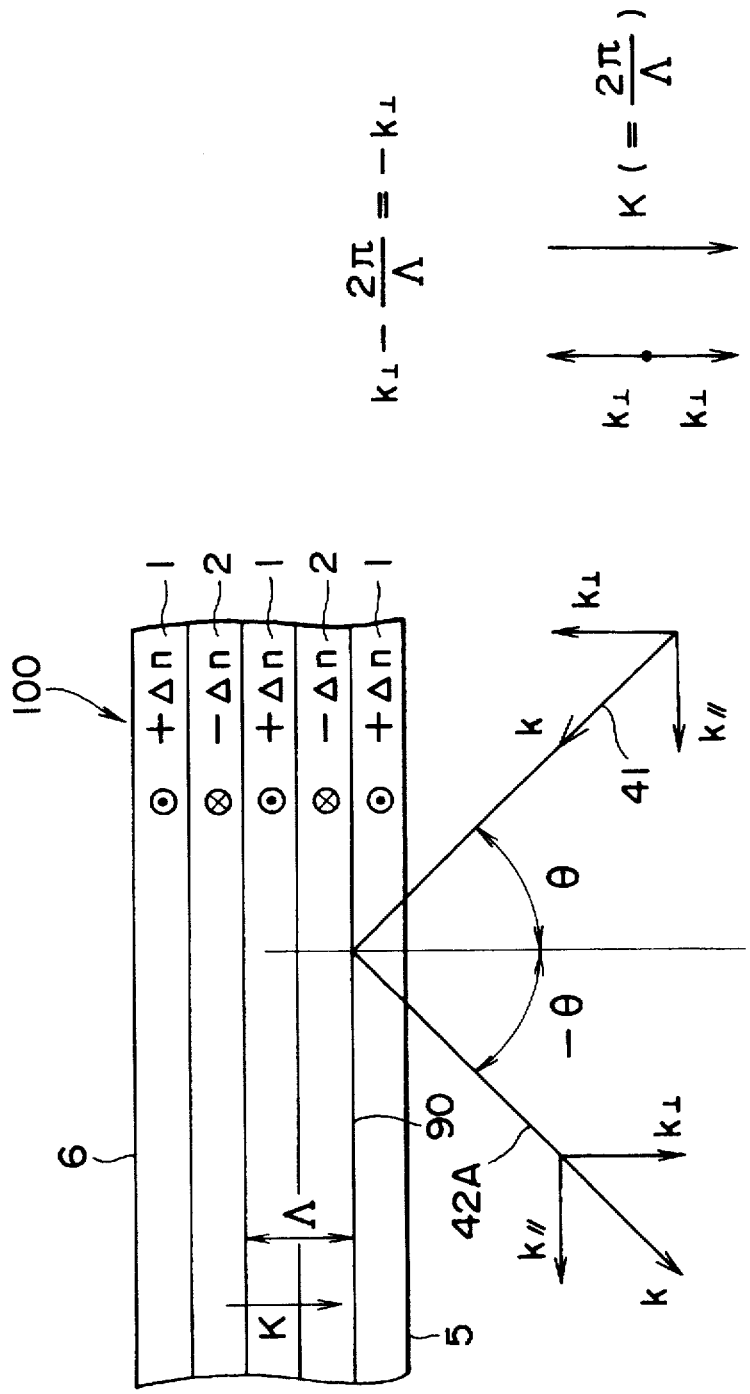
FIG. 18 is a diagram showing the principle of the mechanism of this electrical induction mirror.

FIG. 17 and FIG. 18 show an example where this invention is applied to a mirror 100 induced by an electric field.

A plurality of inverted domains 2 are for example formed on a lithium niobium substrate 1 by the aforesaid method. This domain structure is a periodic inverted structure in which 5 domains are periodically laminated from one end face 5 to the other end face 6 (in FIG. 18, only a few domains are shown to facilitate understanding). Let the period be $\Lambda$.

When a predetermined electric field is applied between the electrodes 3, 4, if the period $\Lambda$ of the periodic inverted structure is chosen satisfying the relation:

$$K = 2k \cdot \cos \theta \qquad (7)$$

$(K=2\pi/\Lambda, k=2n_0\pi/\lambda(n_0=2.200[\lambda=0.633 \text{ nm}]))$
where the wavelength of the incident beam 41 is $\lambda$ and the incidence angle on a periodic domain flat surface 90 is $\theta$, the beam incident on the end face 5 at an angle of $\theta$ is reflected from the periodic domain structure at an emission angle of $-\theta$ so as to obtain a reflected beam 42A.

Hence, when for example the domain direction is chosen so that the flat surface 90 is parallel to the incidence end face 5, a beam incident on the end face 5 at an angle $\theta_1$ is reflected from the end face 6 at an angle $-\theta_1$ only when a predetermined electric field is applied between the electrodes 3, 4, and the beam passes through the device without reflection when a field is not applied between the electrodes.

For example, when the incidence angle on the flat surface 90 is 45°, the period $\Lambda$ of the periodic domain structure may be set to 0.2 μm.

This electrical induction mirror 100 may be manufactured by the same method as the aforesaid optical deflector.

The electrical induction mirror 100 may therefore be switched on and off by an electric field, and it may be manufactured easily and with high precision.

In addition to the aforementioned embodiments of this invention, various modifications are possible without departing from the scope or spirit of the invention.

Figure 19:
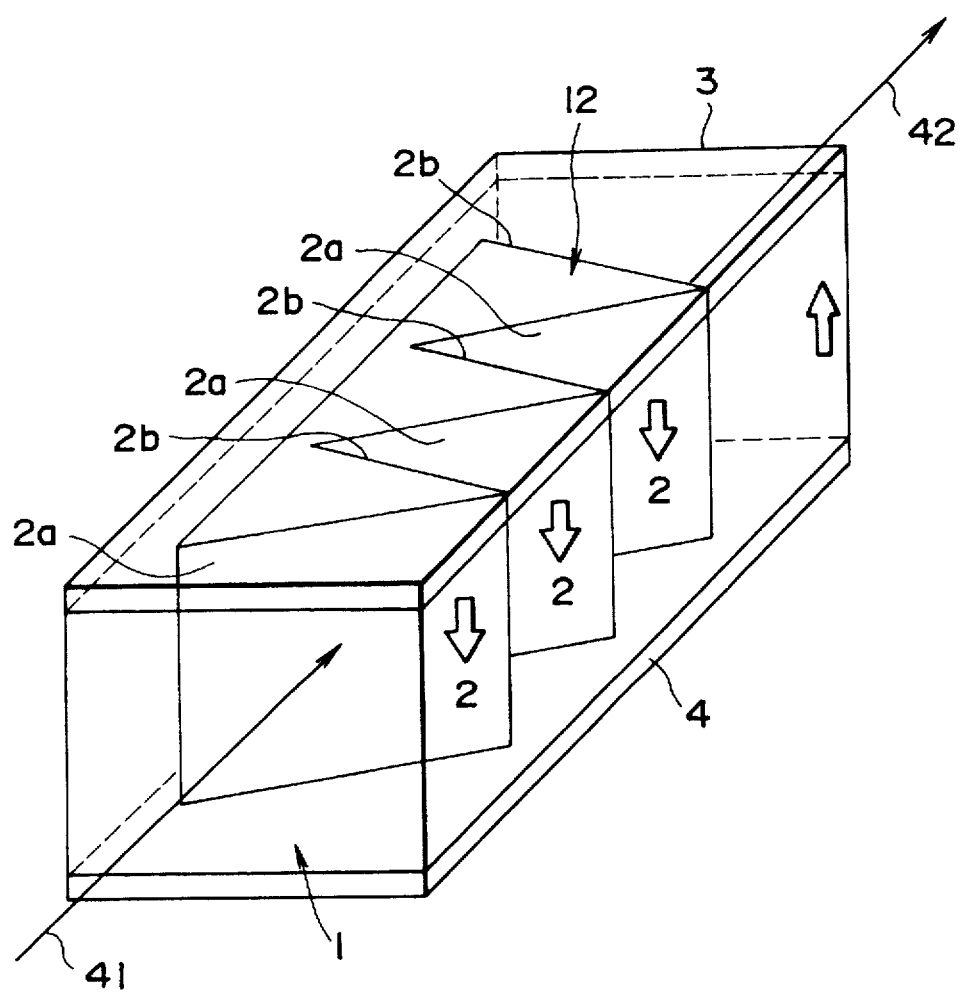
FIG. 19 is a schematic oblique view of yet another optical deflector according to an embodiment of this invention.

For example, the configuration, number, arrangement and methods of forming domains may be varied. Specifically, the object of this invention is achieved when domains are formed in the substrate such that at least one of the domain walls is effectively perpendicular to the principal surfaces of the substrate (surfaces on which electrodes are provided), and a light beam passes through at least two of the domain walls (in other words, through at least two points on the domain walls). It is possible to have one domain where surfaces 2a, 2b are provided as described hereinabove, as shown in FIG. 19.

In this case, it is desirable that there are at least two opposite domain walls of domains horizontally traversed by the beam, the incidence angles of the beam on these walls being different.

In addition to the triangular shape of the aforesaid electrodes 13, the electrodes may be polygonal such as quadrilateral or pentangular, and the other electrode 14 may also be polygonal. Further instead of using the aforesaid electron beam irradiation, domains may be formed also by irradiating with charged particles carrying a negative charge, or by irradiating the surface of the positive pole of spontaneous polarization with charged particles carrying a positive charge (e.g. protons).

When forming domains, if at least one side of an electrode is parallel to a mirror plane of crystals forming the ferro-electric substrate, pole reversion proceeds smoothly, the side of the domain wall on which the beam is incident is parallel to this mirror plane, and the flatness of the domain wall is improved.

In addition to the aforesaid deflector, lens and mirror, the electro-optical device of this invention may be applied to various devices comprising domains and showing an electro-optical effect such an optical modulator or signal processor.

As described hereinabove, according to this invention, at least one of the domain walls of inverted domains of which at least two are formed with a predetermined shape inside a ferro-electric substrate, is substantially perpendicular to the principal surfaces of the substrate. Hence, a refractive index difference is produced between the substrate and inverted domains by applying a voltage via electrodes formed on the principal surfaces of the substrate. As a result, a light beam is largely deflected when it traverses at least two domain walls, and a light beam can be largely deflected by passing it through a plurality of contiguous domain walls.

It is therefore possible to easily construct an electro-optical device, for example an optical deflector (or optical modulator), giving a large deflection angle and high resolving power. Moreover, as it depends on the application of a voltage, it makes fast continuous scan possible even with random access.

As a large deflection angle is obtained based on the aforesaid refractive index difference when the light beam passes through a plurality of domain walls, the light beam can be given a large convergence or divergence which is suitable for a variable focal length lens. In this lens, the focal length may be varied, or the light beam made to converge or diverge, by an electrical signal without any need of mechanical displacement.

In the case of a mirror, as a large deflection is obtained due to the aforesaid refractive index difference by applying a voltage, beam transmission and reflection may be achieved by switching the voltage on and off, and the reflection effect increases when the beam passes through a plurality of domains. This mirror may thus be made to appear and disappear by an electrical signal without any need of mechanical displacement.

Further, according to the electro-optical device of this invention, the propagation direction of a light beam in the device may be kept parallel to the principal surfaces by so selecting the shape of the domain walls that at least one of these walls is substantially perpendicular to the aforesaid principal surfaces of the substrate, hence beam propagation in the device is stable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An electro-optical device comprising a ferro-electric substrate, electrodes provided on principal surfaces of said substrate and inverted domains formed therebetween with a predetermined shape inside said substrate, at least one of the walls of said domains being substantially perpendicular to said principal surfaces of said substrate, at least two domain walls being convex or concave relative to the beam propagation direction, wherein a light beam traversing at least two of said domains walls is deflected by the application of a voltage between the electrodes, the amount of deflection varying according to the voltage applied.

2. An electro-optical device as defined in claim 1, comprising at least two domain walls of opposite inverted domains horizontally traversed by a propagated light beam on each of which said beam has different incidence angles, said beam being deflected according to a voltage applied between electrodes provided on the two opposite principal surfaces of said substrate.

3. An electro-optical device as defined in claim 1, wherein said domain walls are laminated with a predetermined period so that said beam is incident at a predetermined angle, and the propagation direction of said beam is changed by applying a voltage between electrodes provided on the two opposite principal surfaces of said substrate.

4. An electro-optical device as defined in claim 1, wherein electrodes are provided over substantially the whole area of said opposite principal surfaces, and a beam propagation direction is changed according to a voltage applied between these electrodes.

5. An electro-optical device as defined in claim 1, wherein said substrate comprises crystals of $LiNb_xTa_{1-x}O_3$, (where $0 \leq x \leq 1$), and one side of the domain walls is parallel to a mirror plane of said crystals.

6. An electro-optical device as defined in claim 1, wherein electrodes are provided on each of the two principal surfaces of said substrate, an electrode having a predetermined shape is provided on at least one of said principal surfaces, and said inverted domains are formed by applying a voltage between said two principal surfaces.

7. An electro-optical device as defined in claim 6, wherein said electrode on at least one of said principal surfaces is polygonal, and at least one side of said electrode is parallel to a mirror plane of the crystals forming said substrate.

8. An electro-optical device as defined in claim 7, wherein said substrate comprises crystals of $LiNb_xTa_{1-x}O_3$ (where $0 \leq x \leq 1$).

9. An electro-optical device as defined in claim 1, wherein said inverted domains are formed by irradiating the surface of the negative pole of spontaneous polarization of said substrate, with an electron beam or with charged particles having a negative charge.

10. An electro-optical device as defined in claim 1, wherein said inverted domains are formed by irradiating the surface of the positive pole of spontaneous polarization of said substrate, with charged particles having a positive charge.

11. An electro-optical unit comprising a first electro-optical device and a second electro-optical device, each of said electro-optical devices comprising:

a ferro-electric substrate, electrodes provided on principal surfaces of said substrate and inverted domains formed with a predetermined shape inside said substrate, at least one of the walls of said domains being substantially perpendicular to said principal surfaces of said substrate, at least two domain walls being convex or concave relative to a beam propagation direction therethrough, and a light beam traversing at least two of said domain walls;

wherein said first device processes said beam in an x direction and said second device processes said beam in a y direction, of two perpendicular directions xy in a section at right angles to the propagation direction of said beam, wherein said light beam is deflected by the application of a voltage between the electrodes.

12. An electro-optical unit as defined in claim 11, wherein a light beam emission edge of said first device and a light beam incidence edge of said second device is disposed such that they are contiguous and the principal surfaces of said two devices are mutually perpendicular.

13. An electro-optical unit as defined in claim 12, wherein said beam is deflected in said x, y directions, and said first device and said second device are arranged such that their respective principal surfaces are parallel to each other.

14. An electro-optical unit as defined in claim 13, wherein a polarization direction of said beam is deflected such that it is perpendicular to said principal surface of said substrate, said beam is deflected so that it is perpendicular to said beam propagation direction and also perpendicular to an initial beam propagation direction, and wherein said x, y directions in a section at right angles to said initial beam propagation direction are interchanged.

* * * * *